CORRECTING FOR TRANSMISSION VARIATIONS IN TELEVISION

Filed March 1, 1957 3 Sheets-Sheet 1

Inventor
D. G. Perkins
By Mason, Downing & Seebold
Attys.

Inventor
D. G. Perkins
By Glascock Downing & Seebold
Attys.

Inventor
D. G. Perkins
By Glascock Downing Seebold
Attys.

3,019,290

CORRECTING FOR TRANSMISSION VARIATIONS IN TELEVISION

Denis Gordon Perkins, Gerrards Cross, England, assignor to Electric & Musical Industries Limited, Hayes, Middlesex, England, a company of Great Britain Filed Mar. 1, 1957, Ser. No. 643,425
Claims priority, application Great Britain Mar. 1, 1956
10 Claims. (Cl. 178—5.4)

Figure 1:
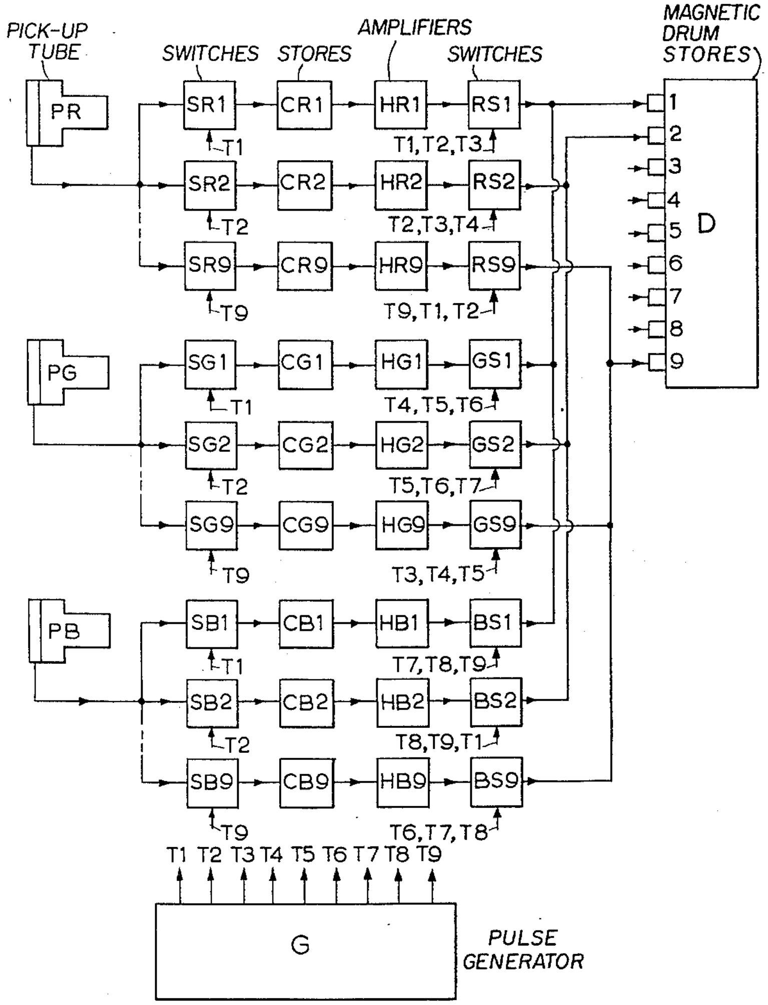

This invention relates to improvements in or relating to correcting for undesired transmission variations in television, especially in colour television apparatus comprising more than one colour channel.

There have been various proposals for the correction of undesired transmission variations in television and other signal transmission apparatus and in one such proposal, namely United States patent specification Number 2,965,711 there is described a magnetic storage method by means of which a signal is stored which can be used repeatedly to correct for such transmission variations. When this arrangement is applied to colour television apparatus comprising, say, three colour channels, as is the case in some simultaneous colour television systems, then three separate magnetic stores are required for corrections of transmission variations in the respective channels. However, magnetic and other forms of stores themselves are susceptible of sensitivity variations so that the use of three separate stores, say, can itself set up a differential sensitivity effect which would cause colour shading.

The object of the present invention is to reduce the above disadvantage.

According to the present invention there is provided television apparatus comprising at least two pick-up tubes each including a target to receive an image and means for scanning a raster on said target to derive an electrical image signal corresponding to said image, said scanning means being predetermined to scan similar rasters on the different pick-up tube targets, a record storage medium, signal transducing means for recording applied signals on said storage medium and gating means for selectively applying electrical signals derived from said pick-up tubes to said transducing means, and timing means for timing operation of said gates to cause signal elements derived from corresponding elemental areas of the respective targets to be recorded on the same location on said record medium.

Also in accordance with the invention there is provided television apparatus comprising at least two pick-up tubes each including a target to receive an image and means for scanning a raster on said target to derive an electrical image signal corresponding to said image, said scanning means being predetermined to scan similar rasters on the different pick-up tube targets, respective modifying means for modifying the signals derived from the targets of said pick-up tubes, a storage medium on which error signals representing undesired transmission variations of the respective pick-up tubes can be stored with elements of said error signals which relate to the same elemental areas of said image in the same location in said storage medium, signal transducing means for deriving error signals from said storage medium and gating means for selectively applying respective error signals derived from the same location in said storage medium by said transducing means simultaneously to said respective modifying means, to cause said modifying means to reduce the effects of undesired transmission variations on electrical image signals derived from said pick-up tubes.

By virtue of the invention, in so far as the stored error signals are themselves subject to sensitivity variations of the storage means, the error signals derived from the storage medium and used in the different colour channels at the same time will be subject to substantially similar variations thereby producing brightness shading only which is less objectionable than colour shading.

This may be achieved by arranging that information relating to the different colour components of a particular part of a picture are located adjacently on the storage medium in the same location since as a result there is little or no discrepancy of storage sensitivity. For example with a storage medium such as a magnetic drum, magnetic disc, magnetic tape or photographic film, the information relating to the different colour channels may be stored in substantial registry in interlaced tracks or may be sampled, at a sufficiently high sampling rate to follow the variations required, and stored in dot sequential manner in the same track or tracks.

Figure 2A:
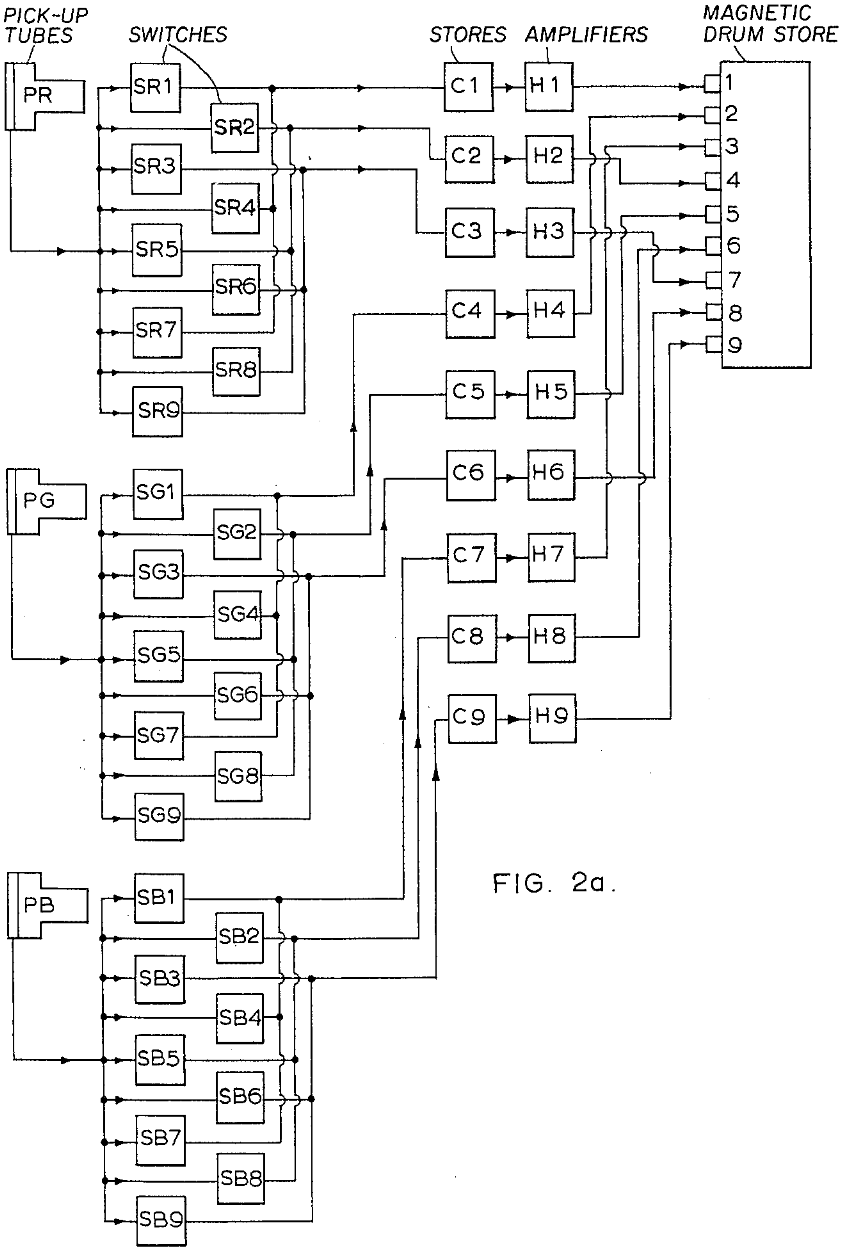
Figure 2B:
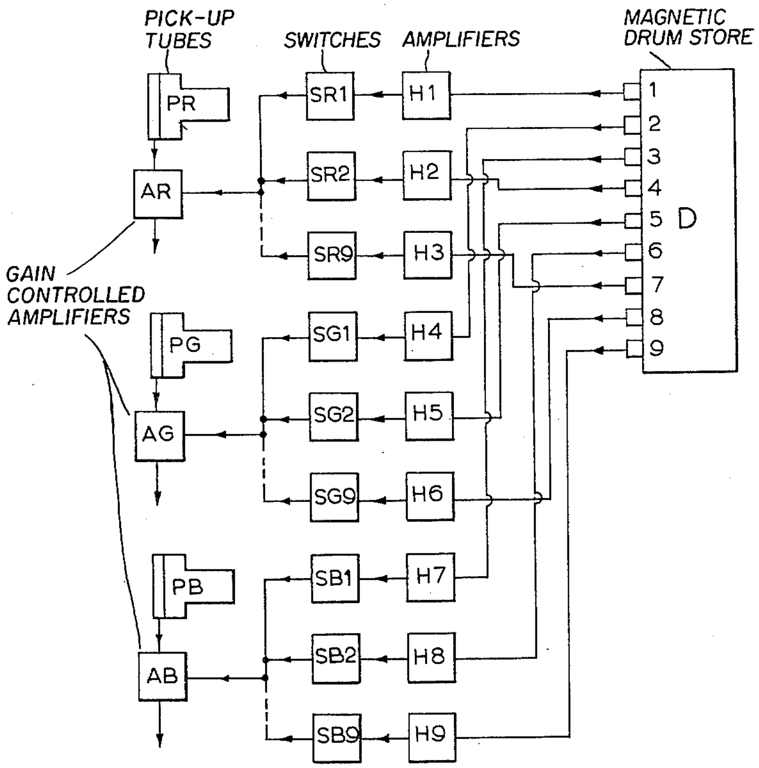

In order that the present invention may be clearly understood and readily carried into effect, the same will now be more fully described with reference to the accompanying drawings, in which:

FIGURE 1 illustrates in schematic form one example of the present invention as applied to a drum storage method, FIGURE 2*a* illustrates a preferred arrangement of apparatus according to the invention and FIGURE 2*b* illustrates an example of apparatus for utilising signals stored by means of an arrangement such as shown in FIGURE 2*a*.

In FIGURE 1 references PR, PG and PB denote the red, green and blue component pick-up tubes, respectively, of a colour television camera for generating simultaneous colour television signals. The operating circuits of these tubes are conventional except for an amplifier in each tube circuit which amplifiers are subject to dynamic gain control to correct for the respective undesired transmission variations of each tube, which may be assumed to be due principally to sensitivity variations of the photo-electrically sensitive surfaces of the tubes. Generally, the arrangement is similar to that described with respect to FIGURE 1(*a*) of the afore-mentioned co-pending patent application, in as far as signals representative of the tube transmission variations are derived before commencing normal operation of the camera by exposing the camera to a constant light, in this case white, for a short time which need only be of the order of one field or one picture period. During this period the tubes are scanned to derive the transmission variation or error signals, which are fed in parallel to different sets of nine switches, namely, SR1 to SR9 for tube PR, SG1 to SG9 for tube PG and SB1 to SB9 for tube PB, only the first two and last ones of each set being shown. These switches may be of the construction shown by FIGURE 1(*b*) of the afore-mentioned co-pending patent application and are successively gated by timing pulses T1 to T9 each having a duration of one ninth of a line scan period from timing pulse generator G, as shown, to apply the error signals to their respective storage condensers CR1 to CR9, CG1 to CG9 and CB1 to CB9 having storage durations of one-third of, two-thirds of and the whole of one line scan period, respectively.

The generator G is of conventional construction and may be, for example, a ring counter, a delay network, or a chain circuit synchronised with line frequency. The storage condensers C may be replaced by low pass filters or other temporary stores.

Thus, short bursts of the error signals are successively applied to their respective storage condensers for durations of one ninth of a line scan period and the condensers are arranged to store these signals for the appropriate periods as afore-mentioned, the stored signals being applied for one third of a line scan period via corresponding amplifiers HR1 to HR9, HG1 to HG9 and HB1 to HB9, and further switches RS1 to RS9, GS1 to GS9 and BS1 to BS9, to one of the "writing" heads 1 to 9 on a magnetic drum D, the particular head being determined according to which timing pulse is associated with the gating of the signal to be stored from a pick-up tube so that the red, green and blue error signals are applied to the drum during the first third, second third and last third of each line scan period, respectively. Hence, corresponding portions of the red, green and blue error signals are stored on the drum in sequence on one track and adjacent portions in the line scan direction of the error information related to the red, green and blue component tubes are stored in adjacent tracks, respectively.

The said further switches may be gated by groups of successive timing pulses or suitable pulses of the correct phase and duration may be derived from a further timing pulse generator or from an earlier stage of the generator G itself if suitably constructed.

The drum completes one revolution in each picture period, so that each circular track on the drum stores error signals representing the transmission variations for a series of elements, one per line for each tube. The error signals on each track from one tube represent the transmission variations of elements arranged in a vertical line, (that is, transverse to the scanning lines of the tube) and the elements for the three tubes are intercalated on each circular track on the drum in a dot interlaced manner. The circular tracks of the drum thus store signals representing transmission variations corresponding to vertical lines in the tubes (nine vertical lines per tube) the vertical lines in the different tubes corresponding to superimposed vertical lines of the image.

Thus the corresponding error signals derived from the tubes PR, PG and PB are stored in multiplex relationship in accordance with the present invention, which also affords a considerable economy of components, namely the use of only one drum with nine heads instead of three drums each with nine heads, as well as the advantage of reducing the colour shading effect mentioned above.

In employing the stored error signals some of the apparatus of FIGURE 1 may readily be arranged to operate also in a converse manner to that described above and in a similar way to that described with reference to FIGURE 2 of the afore-mentioned co-pending patent application to vary the gains of the dynamic gain control amplifiers AR, AG and AB in the output lines of the tubes PR, PG and PB inversely as the corresponding tube error information derived from the drum D. In this case, the heads 1 to 9 are of the "reading-writing" type.

FIGURE 2 illustrates a preferred arrangement of the example of FIGURE 1 which affords a further economy of components and in which the said further switches RS1 to RS9, GS1 to GS9 and BS1 to BS9 are not required and wherein the switches shown are gated as in FIGURE 1(*a*) by the generator G (not shown).

In FIGURE 2*a* the error signals are derived as before from the tubes PR, PG and PB but in this case only three sets of three storage condensers and amplifiers are employed to apply the signals to the drum heads. The error signals from the tube PR are switched to storage condensers C1, C2 and C3 by the switches SR1, SR4 and SR7, SR2, SR5 and SR8, and SR3, SR6 and SR9, respectively, as shown and the outputs of the tubes PG and PB are switched in similar manner to storage condensers C4, C5 and C6, and C7, C8 and C9 respectively. The storage condensers C1 to C9 are arranged to store the error signals for one third of a line scan period only, for which period the signals are fed via corresponding amplifiers H1 to H9 to the drum heads 1, 4, 7, 2, 5, 8, 3, 6 and 9, respectively, so that corresponding portions of the red, green and blue error signals are stored on the drum in corresponding positions of successive tracks. Clearly, it is advantageous to arrange the heads 1 to 9 on the drum to take account of the speed of rotation of the drum so that the above-mentioned corresponding positions of successive tracks lie on a generator of the drum surface and are thus closer to each other than would otherwise be the case.

FIGURE 2(*b*) illustrates an arrangement of the apparatus of FIGURE 2(*a*) for employing the stored error signals to vary in inverse proportion the gains of the output amplifiers AR, AG and AB of the tubes PR, PG and PB, respectively.

Although the arrangements of FIGURES 1 and 2 are related in the above description to a colour television camera including three pick-up tubes for generating simultaneous colour television signals having red, green and blue components, this is only by way of example and it is not intended to limit the invention thereby. The invention may equally well be applied to conversion apparatus for converting sequential colour television signals to simultaneous colour television signals by the use of three display tubes and three pick-up tubes, for example. Similarly colour television systems employing only two colour channels may benefit from the application of the invention. The invention may also find application to stereoscopic television.

In the case of a store of the type employing a television raster, that is a storage tube, or an optical record scanned by a flying spot or camera tube, the signals to be stored may be gated when they are applied to the store and gated in a similar manner when they are being read, so that the information for each correction signal relating to a particular colour component is stored in a number of narrow vertical strips interlaced with information representative of the correction signals relating to the other colour components. Known beam indexing arrangements may of course be used where applicable to facilitate the writing and reading of the information.

An alternative method that may be applied to magnetic stores as well as stores employing cathode ray beam scanning is such that it is arranged that all or some of the information is held in store in a suitable pattern to produce, on reading, a modulated carrier signal of different frequency for each of the signals so stored. For example, the information for one tube may be stored without a pattern to produce signals at video frequency and information for other tubes in patterns of different spacing to produce different carrier frequencies. If a television scan is used in this latter arrangement it is advantageous to arrange the pattern that causes the carrier frequencies to be similar in each line thereby minimising the need for accurate field scan linearity. Where reference is made in the claims to error signal elements relating to similarly located elements of the different targets being located adjacently, such reference is intended to include intercalated relationships such as dot and line interlacing, for example, and superimposed relationships such as described in the preceding paragraph, for example.

What I claim is:

1. Television apparatus comprising at least two pick-up tubes each including a target to receive an image and means for scanning a raster on said target to derive an electrical image signal corresponding to said image, said scanning means being predetermined to scan similar rasters on the different pick-up tube targets, a record storage medium, a plurality of signal transducers for recording applied signals on parallel tracks, and gating means for selectively applying electrical signals derived from said pick-up tubes to said transducers, and means for timing operation of said gates to cause signal elements derived from similarly located elements of the different targets to be recorded adjacently on said record medium.

2. Television apparatus according to claim 1, said pick-up tubes being responsive to different colour components of a light image to produce simultaneous image signals corresponding to said different colour components.

3. Television apparatus comprising at least two pick-up tubes each including a target to receive an image and means for scanning a raster on said target to derive an electrical image signal corresponding to said image, said scanning means being predetermined to scan similar raster on the different pick-up tube targets, a magnetic record storage medium, signal transducing means for recording applied signals on said storage medium and gating means for selectively applying electrical signals derived from said pick-up tubes to said transducing means, and timing means for timing operation of said gates to cause groups of signal elements derived from corresponding elemental areas of the respective targets to be recorded on the same track on said record medium, each group of signal elements consisting of one signal element from one elemental area of each of the respective targets, each group of signal elements being recorded on said same track before the group of signal elements derived from a further elemental area of the respective targets is recorded on said track.

4. Television apparatus comprising at least two pick-up tubes each including a target to receive an image and means for scanning a raster on said target to derive an electrical image signal corresponding to said image, said scanning means being predetermined to scan similar rasters on the different pick-up tube targets, a magnetic drum store, a plurality of transducing heads for recording applied signals on parallel tracks on said drum store and gating means for selectively applying electrical signals derived from said pick-up tubes to said transducing heads, and timing means for timing operation of said gates to cause signal elements derived from corresponding elemental areas of the respective targets to be recorded adjacently on said magnetic drum store.

5. Television apparatus according to claim 4, said timing means comprising means for timing the operation of said gates to cause the signal elements derived from corresponding elemental areas of the respective targets to be recorded adjacently on different tracks on said magnetic drum store.

6. Television apparatus according to claim 5, said pick-up tubes being responsive to different colour components of a light image to produce simultaneous image signals corresponding to said different colour components.

7. Television apparatus comprising at least two pick-up tubes each including a target to receive an image and means for scanning a raster on said target to derive an electrical image signal corresponding to said image, said scanning means being predetermined to scan similar rasters on the different pick-up tube targets, respective modifying means for modifying the signals derived from the targets of said pick-up tubes, a magnetic storage medium on which error signals representing undesired transmission variations of the respective pick-up tubes are stored in successive groups of signal elements in the same track of said storage medium each group consisting of one signal element relating to one elemental area of each of the respective targets, signal transducing means for deriving error signals from said storage medium and gating means for selectively applying respective error signals derived from the same track of said storage medium by said transducing means simultaneously to said respective modifying means, to cause said modifying means to reduce the effects of undesired tranmission variations on electrical image signals derived from said pick-up tubes.

8. Television apparatus comprising at least two pick-up tubes each including a target to receive an image and means for scanning a raster on said target to derive an electrical image signal corresponding to said image, said scanning means being predetermined to scan similar rasters on the different pick-up tube targets, respective modifying means for modifying the signals derived from the targets of said pick-up tubes, a magnetic storage medium on which error signals representing undesired transmission variations of the respective pick-up tubes can be stored in successive groups of signal elements in adjacent tracks of said storage medium, each group consisting of one signal element relating to one elemental area of each of the respective targets, signal transducing means for deriving error signals from said storage medium and gating means for selectively applying respective error signals derived from adjacent tracks of said storage medium by said transducing means simultaneously to said respective modifying means to cause said modifying means to reduce the effects of undesired transmission variations on electrical image signals derived from said pick-up tubes.

9. Television apparatus comprising at least two pick-up tubes each including a target to receive an image and means for scanning a raster on said target to derive an electrical image signal corresponding to said image, said scanning means being predetermined to scan similar rasters on the different pick-up tube targets, respective modifying means for modifying the signals derived from the targets of said pick-up tubes, a magnetic drum store on which error signals representing undersired transmission variations of the respective pick-up tubes can be stored in parallel tracks with elements of said error signals which relate to the same elemental areas of said image stored adjacently in said magnetic drum store, a plurality of signal transducing heads for deriving error signals from said magnetic drum store and gating means for selectively applying respective adjacently stored error signals derived from said drum store simultaneously to said respective modifying means to cause said modifying means to reduce the effects of undesired transmission variations on electrical image signals derived from said pick-up tubes.

10. Television apparatus comprising at least two pick-up tubes each including a target to receive an image and means for scanning a raster on said target to derive an electrical image signal corresponding to said image, said scanning means being predetermined to scan similar rasters on the different pick-up tube targets, respective modifying means for modifying the signals derived from the targets of said pick-up tubes, a magnetic drum store on which error signals representing undesired transmission variations in the respective pick-up tubes can be stored on a plurality of parallel tracks with elements of said error signals which relate to the same elemental areas of said image stored adjacently on different tracks in said drum store, a plurality of signal transducing heads for deriving error signals from said magnetic drum store and gating means for selectively applying respective error signals derived from adjacent storage positions on different tracks of said drum store simultaneously to said respective modifying means to cause said modifying means to reduce the effects of undesired transmission variations on electrical image signals derived from pick-up tubes.

References Cited in the file of this patent

UNITED STATES PATENTS

| | | |
|---|---|---|
| 2,606,245 | Hall | Aug. 5, 1952 |
| 2,695,331 | Johnson | Nov. 23, 1954 |
| 2,698,875 | Greenwood | Jan. 4, 1955 |